United States Patent [19]
Kita et al.

[11] Patent Number: 5,307,291
[45] Date of Patent: Apr. 26, 1994

[54] INSTRUMENT FOR ANALYSIS OF LEVITATION OF RAPIDLY MOVING STRUCTURE SUCH AS A MAGNETIC TAPE ACROSS AN AIR GAP

[75] Inventors: Hiromi Kita, Kashihara; Hidetoshi Kotera, Toyonaka; Kazuyuki Sakiyama, Moriguchi; Akira Ahagon, Neyagawa, all of Japan

[73] Assignee: Matsushita Electric Industrial Co. Ltd., Kadoma, Japan

[21] Appl. No.: 701,214

[22] Filed: May 16, 1991

[30] Foreign Application Priority Data

May 16, 1990 [JP] Japan ................... 2-127364

[51] Int. Cl.$^5$ ................ G06F 15/20; G06F 15/324
[52] U.S. Cl. .................... 364/560; 364/563; 360/130.24
[58] Field of Search ............ 364/560, 508, 563, 562; 73/788, 804, 826, 783; 360/84, 85, 107, 130.22, 130.23, 130.24, 103.22–103.24

[56] References Cited

U.S. PATENT DOCUMENTS

| | | | |
|---|---|---|---|
| 4,674,028 | 6/1987 | Shioya et al. | 364/148 |
| 4,974,140 | 11/1990 | Iba et al. | 363/74 |
| 5,008,769 | 4/1991 | Kaneko et al. | 360/130.24 |
| 5,041,937 | 8/1991 | Saito | 360/130.24 |

FOREIGN PATENT DOCUMENTS

0273593  7/1988  European Pat. Off. ....... G01B 7/28

*Primary Examiner*—Kevin J. Teska
*Attorney, Agent, or Firm*—Ratner & Prestia

[57] ABSTRACT

An instrument is disclosed for the analysis of the levitation of a structure such as a video tape rapidly running through fluid such as air, by simultaneously solving an equation on the pressure of fluid and an equation on the displacement of the structure. The instrument may include a data input part for reading data regarding the fluid and structure, a levitation analysis part for forming and solving simultaneous equation on the fluid and structure based on the input data, and a result output part for outputting the analyzed result.

13 Claims, 5 Drawing Sheets

INSTRUMENT FOR ANALYSIS OF LEVITATION OF RAPIDLY MOVING STRUCTURE SUCH AS A MAGNETIC TAPE ACROSS AN AIR GAP

FIELD OF THE INVENTION

This invention relates to an instrument for analysis of levitation of a structure, such as a video tape, running at high speed on an apparatus, such as a video tape recorder. Hereinafter, for simplicity, this instrument will be referred to as a levitation analyzer.

BACKGROUND OF THE INVENTION

For the numerical analysis of the levitation of a rapidly running structure, such as a tape for a video tape recorder, a difference method is currently used. In this case, however, division of the analyzed domain of the object model to be analyzed into elements is confined to that of an orthogonal lattice, due to the inherence of the numerical analysis.

Figure 3:
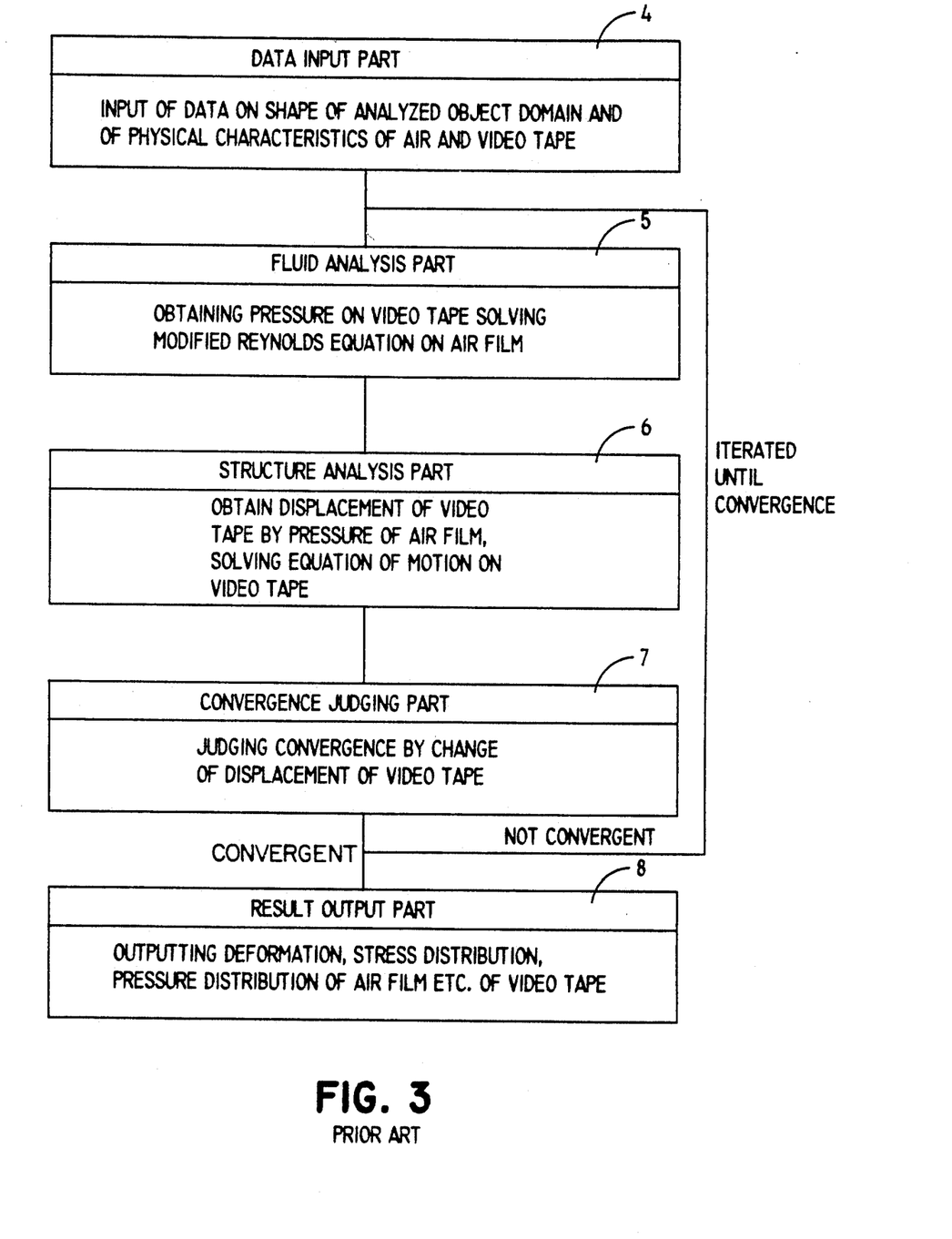
FIG. 3 is a block diagram showing the construction of a conventional levitation analyzer.

As for the construction of the analyzer, a known analyzer is shown in FIG. 3, has data input part 4, fluid analysis part 5 to compute the pressure of an air film, structural analysis part 6 to compute the displacement of a video tape, convergence judging part 7, and result output part 8. The levitation of the video tape is analyzed by alternately iterating fluid analysis and structure analysis to obtain a convergence solution.

The function of a conventional levitation analyzer having the construction described above is explained as follows. First, data relating to the geometrical shape of the analyzed domain of analyzed object model, the physical characteristics of the air, and the physical characteristics of the tape are entered at data input part 4. Based on this input data, fluid analysis part 5 solves a modified Reynolds equation on the air film to obtain the pressure acting on the tape. Then, at structural analysis part 6 from both the information on the pressure obtained at the fluid analysis part 5, and the data entered at data input part 4, an equation of motion on the tape is solved and the displacement of the video tape by the pressure of the air film is obtained. The output from the structural analysis part 6 is returned from the convergence judging part 7 to the input of the fluid analysis part 5, and analysis is again carried out, comparing the results of iterated computing with the former result. Iteration of the computing occurs until no difference is observed on the displacement of the tape, i.e. the convergence is judged by the convergence judging part 7. In such a manner, computing is iterated until the convergence is judged by the convergence judging part 7. The results as judged by the convergence judging part 7 are put out as various data such as either the deforming state and stress distribution of the tape or the pressure distribution of the air film.

A calculating process, such as described above, however, needs long computing time before the calculation converges. This is because the fluid analysis in the fluid analysis part and the structural analysis in the structural analysis part are independently carried out resulting in computation being iterated many times.

Also, analysis information of high accuracy was not obtained, since the difference method, of which the analyzing object was confined to an orthogonal lattice only, could not make an exact model of the cylinder or the head of the tape recorder (having, in fact, various curved surface).

SUMMARY OF THE INVENTION

It is an object of the present invention, to provide an instrument for analysis of the levitation of a rapidly running tape (i.e. a levitation analyzer), which can make an accurate model of the curved surface of the model analyzed (such as a cylinder or a head of a video cassette recorder), and can obtain highly accurate results, with reduced computational complexity and reduced computing time.

In order to accomplish the above object, the levitation analyzer, according to the invention, comprises a data input part, a levitation analysis part, and an output part. The data input part is used for reading various data relating to the fluid and/or structure. The levitation analysis part solves the simultaneous basic equation on the characteristics of the fluid and structure, on the bases of the data put in by the data input part, to obtain analyzed information on the entwined problem of the fluid and structure. The output part outputs the results thus analyzed by the levitation analysis part.

The levitation analyzer of the present invention, as described above, is characterized in that the analyzer makes and solves a simultaneous equation consisting of an equation relating to the pressure of the fluid and an equation relating to the displacement of the structure of the model object, to analyze the levitation of the structure. This results in reduced computational complexity and improved accuracy of analysis.

For example, on a computer, the analyzer divides the object domain of the analyzed model into a plurality of small element domains of simple shape, makes an equation of the air film pressure (unknown) and an equation on tape displacement (unknown) in each element, solves these equations simultaneously by the finite element method, and carries out the analysis relating to the levitation of the tape.

Thus, by the simultaneous execution of fluid analysis and structural analysis, computational complexity is reduced. Also, by using the finite element method for numerical analysis, an analyzer is obtained which can make an accurate model of the curved surface of the cylinder or the head to be analyzed, and is effective for computing time reduction and accuracy improvement.

DETAILED DESCRIPTION OF THE INVENTION

Referring now to the drawings, an embodiment of the present invention is explained as follows:

In this exemplary embodiment, the levitation of a tape on the rotating cylinder of a video deck is analyzed as an entwined problem of fluid (air film) and structure (video tape). Optimum values of various parameters for the stable running of the video tape (for example, rotating speed of the cylinder, shape of the head, tension of the tape) is obtained.

Levitation of a video tape is generated by an interaction of an air film (fluid) and video tape (flim-like structure). Accordingly, analysis of levitation of a video tape is to be treated as an entwined problem of fluid (air film) and structure (video tape).

Figure 1:
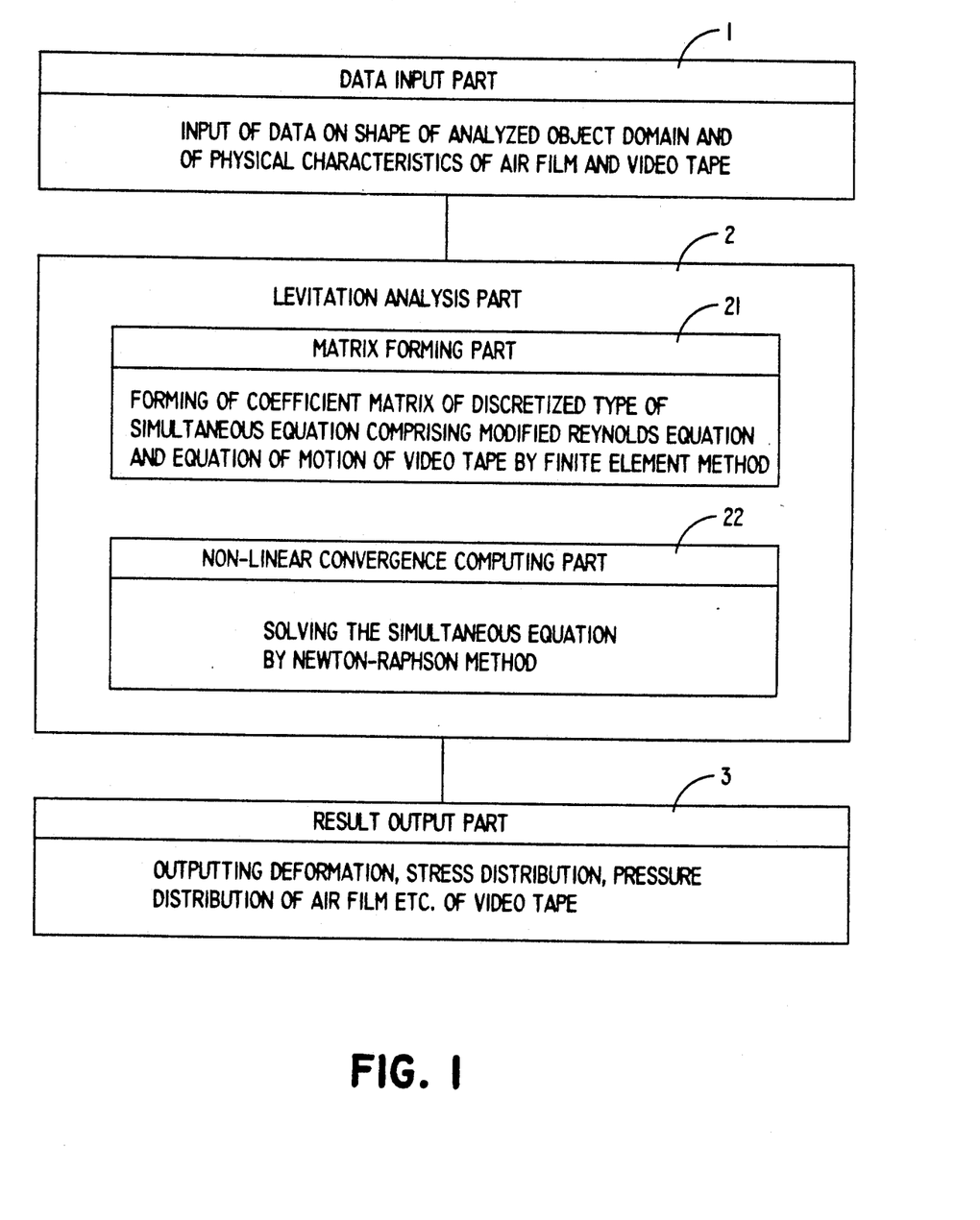
FIG. 1 is a block diagram showing the construction of a levitation analyzer embodying the present invention.

FIG. 1 is a block diagram showing an exemplary organization of a video tape analyzer embodying the present invention.

The levitation analyzer embodying the invention is provided with a data input part 1 for reading data, matrix forming part 21 for forming coefficient matrix of the simultaneous equation on fluid and structure based on the input data, levitation analysis part 2 having a non-linear convergence computing part which carries out iterated non-linear computing, and output part 3 putting out the information thus analyzed and results obtained by the levitation analysis part 2.

Explained in detail, data input part 1 is an input means, for example, such as a key board to put in a node and element obtained by dividing the analyzed domain of the object model into a plurality of simple-shaped elements, various physical characteristics of the air film and video tape, data on boundary conditions (thickness of air-film h), mean free path of molecule, viscosity coefficient of air, relative speed between the cylinder and video tape etc. (explained later). Matrix 21 of levitation analysis part 2 is a means to make a coefficient matrix of simultaneous equations on the fluid and structure based on the entered data.

A fundamental equation showing the characteristics of fluid (air film) and structure (video tape) which are the bases of the simultaneous equation is given as follows. Pressure p by an air film is given by the next modified Reynolds equation (1):

$$\left\{ \frac{\partial}{\partial x} \left( h^3 p \frac{\partial p}{\partial x} \right) + \frac{\partial}{\partial y} \left( h^3 p \frac{\partial p}{\partial y} \right) \right\} + \tag{1}$$

$$6\lambda p_a \left\{ \frac{\partial}{\partial x} \left( h^2 \frac{\partial p}{\partial x} \right) + \frac{\partial}{\partial y} \left( h^2 \frac{\partial p}{\partial y} \right) \right\} = 6\mu\nu \frac{\partial}{\partial x} (hp)$$

where h is the thickness of the air film, p is the pressure by the air film, $\lambda$ is the mean free path of the molecule, $p_a$ is the ambient pressure, $\mu$ is the viscosity coefficient, and $\nu$ is the relative speed between the cylinder and video tape. Displacement W of the video tape is expressed by the following equation (2) of motron:

$$D\left( \frac{\partial^4 w}{\partial x^4} + 2 \frac{\partial^4 w}{\partial x^2 \partial y^2} + \frac{\partial^4 w}{\partial y^4} \right) + (\rho\nu - T)\frac{\partial^2 w}{\partial x^2} = p - p_a \tag{2}$$

where $D = Et^3/12(1-\nu^2)$ is the flexural rigidity, E is the Young's modulus, t is the thickness, $\nu$ is the Poisson's ratio, W is the displacement, $\rho$ is the density, T is the tension of the video tape, and $\nu$ is the relative speed between the cylinder and video tape.

Also, the thickness h of air film and the displacement W of video tape have the relation given by the following equation (3):

$$h = h_\phi - w \tag{3}$$

where $h_\phi$ is a parameter showing the shape of the cylinder and head.

Whereas the conventional analyzer has put out analytical information by iteratedly solving the equation (1) and (2) separately and alternatively to obtain the convergence solution, the matrix constructing part 21 of the present invention obtains coefficient matrix information by solving these equation (1) and (2) simultaneously, thus reducing computational complexity and computing time. Assuming W among h and W to be an independent function, with the relation given by equation (3) in mind, equation (1) and (2) become a simultaneous partial differential equation on video tape displacement W and air film pressure P. This simultaneous partial differential equation may be analyzed by the finite element method.

Now, equations (1) and (2) are, in order to analyze numerically by finite element method, made discrete by the method of weighted residuals.

Assuming interpolating function of unknown number p and W to be p* and W*, respectively, and weighted function having the same form as these to be $\Phi w^*$, $\Phi p^*$, and applying the method of weighted residuals on equations (1) and (2), the following equations (4) and (5) are obtained:

$$\int_V K(p^*, w^*)\Phi_w^* dxdy + \int_S A\Phi_w^* ds + \int_S \frac{\partial \Phi_w^*}{\partial n} ds = O \tag{4}$$

$$\int_V F(p^*, w^*)\Phi_p^* dxdy + \int_S C\Phi_p^* ds = O \tag{5}$$

where V represents an analytical domain, S represents a boundary, ds is a curvilinear integral, A, C, are the boundary condition. The condition to make equations (4) and (5) true for arbitrary value of weighted function $\Phi w^*$, and $\Phi p^*$ is the discrete equation which is calculated by a method of weighted residuals.

Matrix representation of the discrete equation deduced from equations (4) and (5) is the following equation (6):

$$\left| \frac{\{K(w)\}}{\{F(p)\}} \right| = \left| \frac{\{0\}}{\{R(p)\}} \right| \tag{6}$$

in which {{K(w)} is induced from equation (4), and {F(p)}, and {R(p)} are induced from equation (5).

Equation (6) becomes a simultaneous non-linear equation, for which iterated non-linear computing is necessary.

Thus, the non-linear convergence computing part 22 of the levitation analysis part 2 carries out iterated non-linear computing. For the non-linear computing, the inventors adopted the Newton-Raphson method. Correction information of the solution in non-linear computing is obtained by the equation (7):

$$\left| \begin{array}{cc} \frac{\partial K}{\partial w} & \frac{\partial K}{\partial p} \\ \frac{\partial F}{\partial w} & \frac{\partial F}{\partial p} \end{array} \right| \left| \begin{array}{c} \Delta w \\ \Delta p \end{array} \right| = \left| \begin{array}{c} -K \\ -F \end{array} \right| \tag{7}$$

where K and F mean K(w,p) and F(w,p) respectively, and are the discretized equation lead from equation (4) and (5), and W, p represent correction for unknown number W, p.

Non-linear convergence calculation part 22 can obtain convergence solution information by iteratedly computing equation (7).

Figure 2A:
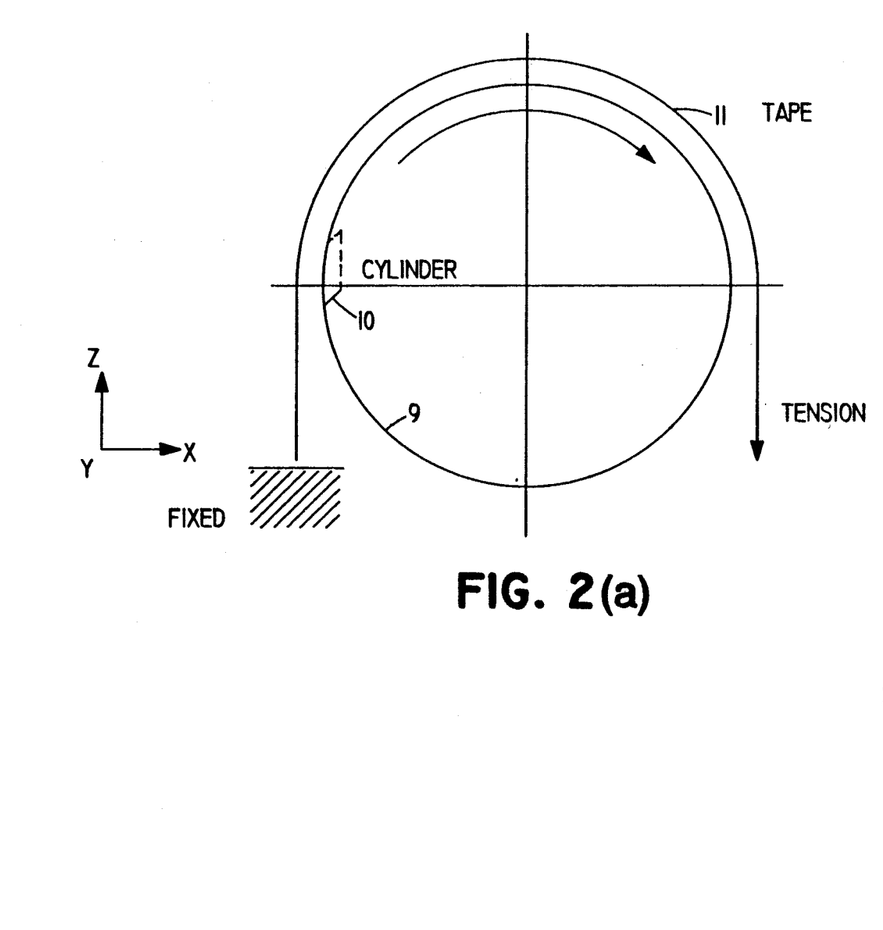
FIG. 2(a) is a diagrammatic end view of an analyzer of the present invention.
Figure 2B:
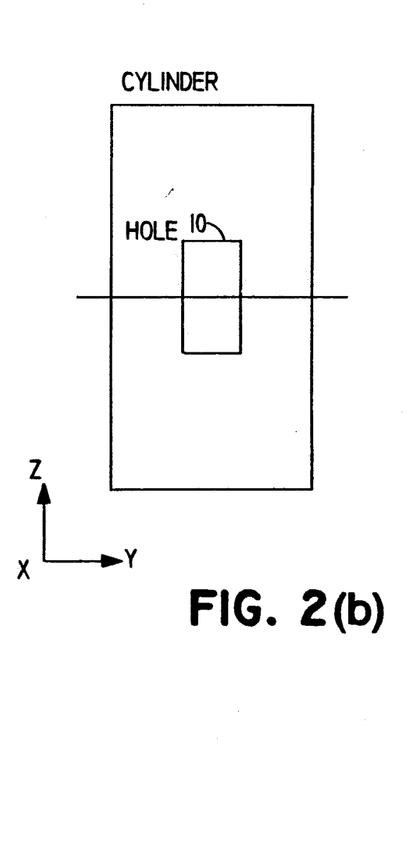
FIG. 2(b) is a side view of the cylinder in the analyzer of FIG. 2(a)

FIG. 2 shows an example of analysis according to the present invention, and FIG. 2(a) and (b) shows a cylinder of a tape recorder and an object model to be analyzed, respectively.

Figure 2C:
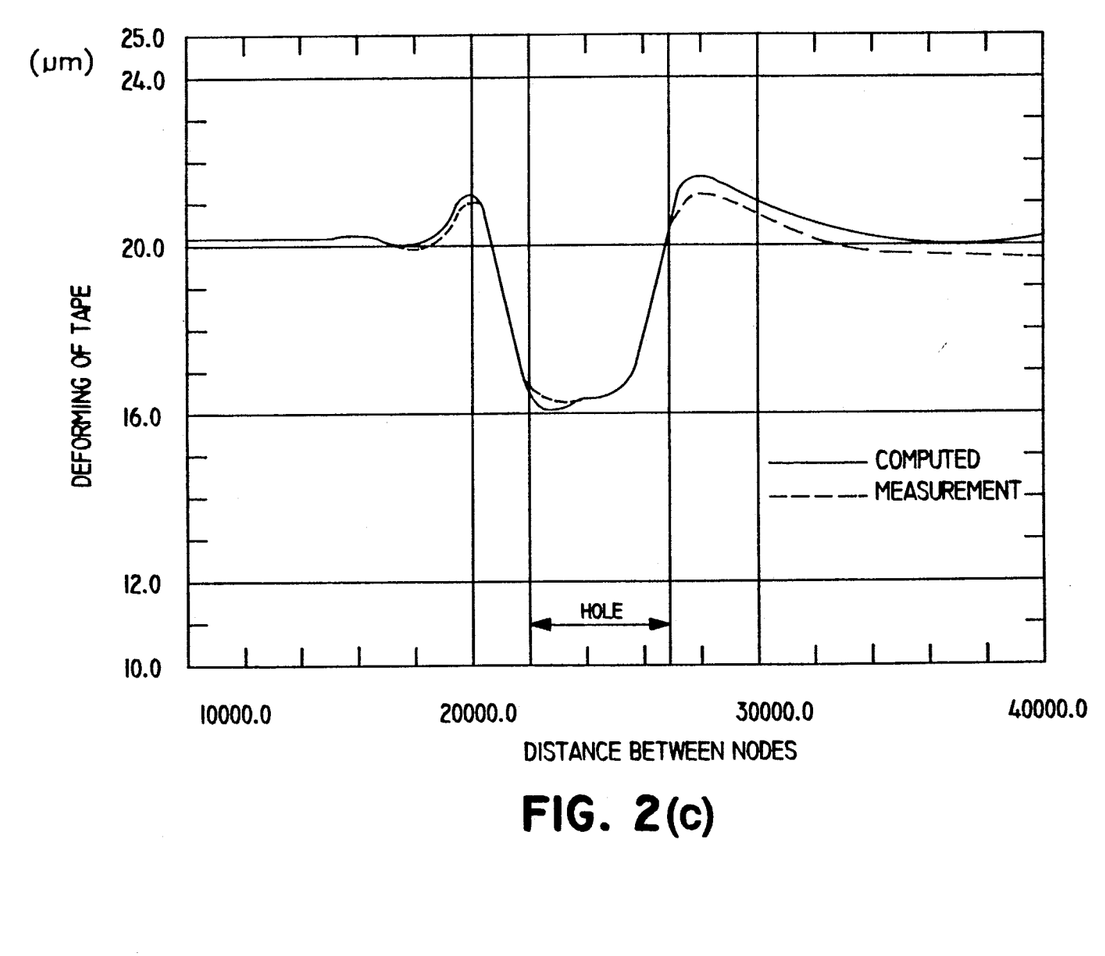
FIG. 2(c) is a graph showing the results of analysis.
Figure 2D:
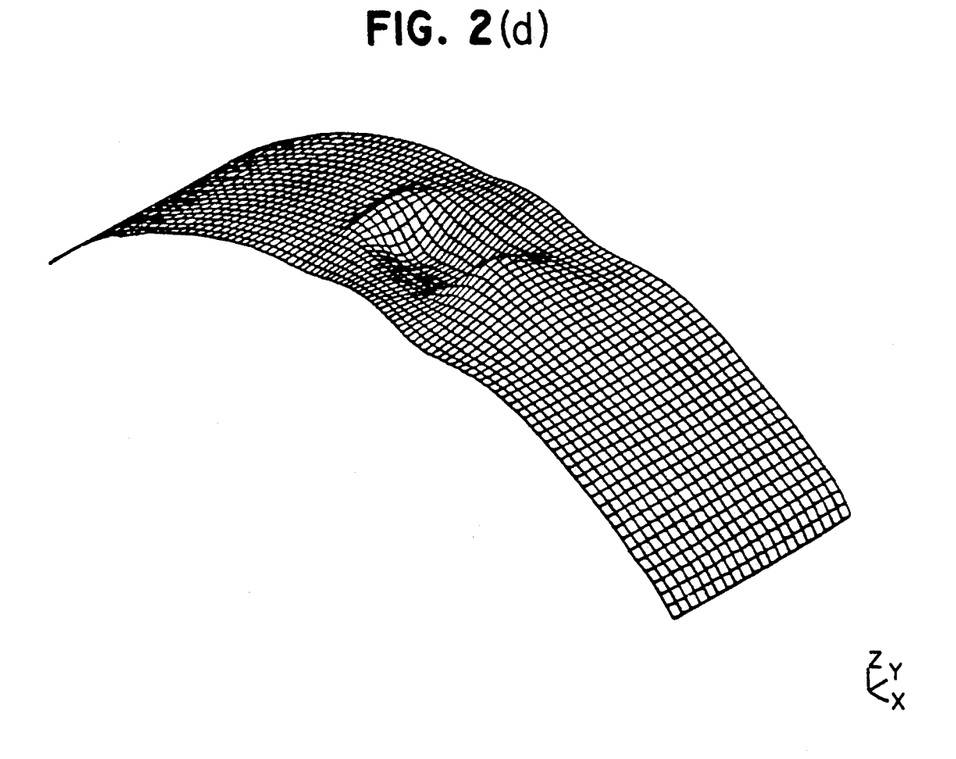
FIG. 2(d) is a perspective view of the deformation showing the result of analysis.

For a video tape on a rotating cylinder 9 having a rectangular hole 10 of 3 mm width, 5 mm length, and 0.007 mm depth (not shown in scale), strain of the tape adjacent to the hole is given according to the invention. In FIG. 2(c), relating to the deformation of the central part of the video tape 11, the computed result by the invented method and that obtained by measurement are shown by the solid and dotted lines respectively, for comparison. Also, FIG. 2(d) is a perspective view of a deformed video tape as computed by the invention.

Result output part 3 is an output means to output the data such as the shape, stress distribution, pressure distribution of the air film obtained in the levitation analysis part 21. This may be, for example, a printer, CRT or a plotter.

As explained above, according to the invention, by solving simultaneously the equation of the air film pressure and that of the video tape displacement, levitation is analyzed with reduced computational complexity and shortened computing time.

Further, by the adoption of a finite element method, an accurate model of the cylinder and head is obtained, resulting in a highly accurate solution.

The levitation analysis part of the invention may be formed by software or firmware in a computer.

As explained above, the instrument for the analysis of levitation is characterized by the data input part for reading data relating to the fluid and/or structure, the levitation analysis part for obtaining information, the entwined problem of fluid and structure by solving simultaneously the basic equations representing the characteristics of the fluid and construction body based on the data as put in by the data input part, and the result output part for outputting the analyzed result as analyzed in the levitation analysis part. The information on the levitation of a body, such as a video tape, running rapidly in fluid, such as air, can thus be analyzed quickly and accurately.

While the invention has been described in terms of an exemplary embodiment, it is contemplated that it may be practiced as outlined above with modifications within the spirit and scope of the appended claims.

What is claimed:

1. Apparatus for analyzing levitation of a tape structure moving on a head and cylinder, said apparatus comprising:

data input means for receiving a plurality of data values relating to: physical characteristics of said tape structure, physical characteristics of an air film which applies pressure to said tape structure as said tape structure moves across said head and cylinder, and shape of said tape structure cylinder;

levitation analysis means for receiving said plurality of data values from the data input means, for providing a plurality of simultaneous equations in which ones of said plurality of data values are interrelated, and for solving said plurality of simultaneous equations to provide a further plurality of data values indicative of deformation of said magnetic tape, said levitation analysis means including a computer implemented device for solving said plurality of simultaneous equations; and output means for generating signals corresponding to said further plurality of data values provided by the levitation analysis means to adjust at least one physical characteristic relating to one of said head and said cylinder.

2. Apparatus for analyzing levitation of a tape structure moving on a head and cylinder according to claim 1, wherein the levitation analysis means carries out analysis computing by a finite element method on levitation of the structure, combining numerical analysis on the air film and numerical analysis on the tape structure.

3. Apparatus for analyzing levitation of a tape structure moving on a head and cylinder according to claim 1, said apparatus further comprising means for adjusting at least one of rotation speed of said head and cylinder and tension of said tape structure based upon at least one of said further plurality of data values in order to reduce levitation of said tape structure.

4. Apparatus for analyzing levitation of a tape structure moving on a head and cylinder according to claim 1, wherein the plurality of data values relating to physical characteristics of the tape structure include a data value relating to tension of the tape structure.

5. Apparatus for analyzing levitation of a tape structure moving on a head and cylinder according to claim 1, further including display means for displaying said further plurality of data values.

6. Apparatus for analyzing levitation of a tape structure comprising:

data input means for receiving a plurality of data values relating to: physical characteristics of said tape structure, physical characteristics of an air film which applies pressure to said tape structure as said tape structure moves across said head and cylinder, and shape of said tape structure cylinder;

matrix forming means for forming a plurality of simultaneous non-linear equations including a first equation on air film pressure and a second equation on tape structure displacement, based on said plurality of data values received by the data input means, non-linear convergence means for performing an iterated non-linear evaluation of said plurality of simultaneous non-linear equations as formed in the matrix forming means to form a further plurality of data values, said non-linear convergence calculation means including a computer implemented device for performing said iterated non-linear evaluation, said output means for generating signals corresponding to the further plurality of data values formed by the non-linear convergence calculation means to adjust at least one physical characteristic relating to one of said head and said cylinder.

7. Apparatus for analyzing levitation of a tape structure moving on a head and cylinder according to claim 6, wherein the matrix forming means includes means for carrying out numerical analysis by a finite element method.

8. Apparatus for analyzing levitation of a tape structure moving on a head and cylinder according to claim 6, wherein, in the matrix forming means, the simultaneous non-linear equations are formed by calculating a discrete equation from the first and second equations by a method of weighted residuals.

9. Apparatus for analyzing levitation of a tape structure moving on a head and cylinder according to claim 8, wherein the discrete equation is computed by matrix representation.

10. Apparatus for analyzing levitation of a tape structure moving on a head and cylinder according to claim 6, wherein Newton-Raphson method is used for iterated non-linear computing in the non-linear convergence calculation means.

11. Apparatus for analyzing levitation of a tape structure moving on a head and cylinder according to claim 6, said apparatus further comprising means for adjusting at least one of rotation speed of said head and cylinder and tension of said tape structure based upon at least one of said further plurality of data values in order to reduce levitation of said tape structure.

12. Apparatus for analyzing levitation of a tape structure moving on a head and cylinder according to claim 6, wherein the plurality of data values relating to physical characteristics of the tape structure include a data value relating to tension of the tape structure.

13. Apparatus for analyzing levitation of a tape structure moving on a head and cylinder according to claim 6, further including display means for displaying said further plurality of data values.

* * * * *

UNITED STATES PATENT AND TRADEMARK OFFICE
CERTIFICATE OF CORRECTION

PATENT NO. : 5,307,291
DATED : April 26, 1994
INVENTOR(S) : Kita et al.

It is certified that error appears in the above-indentified patent and that said Letters Patent is hereby corrected as shown below:

On the title page: Item [54] and Column 1, line 2 delete "ANALYSIS OF" and insert --ANALYZING THE--;

Column 1, lines 2-3  after "LEVITATION OF" insert --A--.

At Column 6, Claim 6, line 38, delete "tape structure" and insert therefor --head and--.

Signed and Sealed this

Fourth Day of April, 1995

Attest:

BRUCE LEHMAN

Attesting Officer  Commissioner of Patents and Trademarks